«2,877,130

PAINT BASE

Maurice Caron and Ralph E. Etheridge, Maple Grove, Quebec, Canada, assignors to Walter B. Jamieson No Drawing. Application April 1, 1957
Serial No. 649,632

1 Claim. (Cl. 106—228)

The present invention relates to a liquid transparent base for use in the preparation of coloured paints.

PRIOR ART

Paint is a widely known commodity and is conventionally dispensed mainly in two ways.

One way consists in the manufacture of mixing pigments directly with suitable vehicles in order to supply the user with a complete line of ready mixed paints, enamels, flats, satin finishes or exterior paints of different colours. With the usual pigments and vehicles the proper dispersion of the pigment in the vehicle ordinarily, requires expert skill and apparatus which is not possessed by the average user.

This procedure in the preparation and handling of paint and other pigment vehicles also have the disadvantage that a wide variety of colours of the various paint compositions must be carried in stock over relatively long periods of time, and the total quantity or bulk of paint in storage is necessarily very large. The demand for some colours is naturally much greater than for others so that the colours for which there is little demand will stand on the shelves of the paint shop or in a warehouse over a considerably longer period of time than the others. As a result, the pigments tend to settle and harden, skin tends to form on the surface of the paint, and special means must be provided in some cases to redisperse the pigments and to prevent the formation of such skin.

Another way of dispensing paint consists in providing colour pigments in a metal tube along with a paint base, said paint base being a usable paint in itself and containing hiding or active pigments, but lacking the ultimate tinting pigment. In accordance with the procedure, pigments are milled with suitable media to form a concentrated colour paste which can be manually incorporated in a liquid paint system, and known in the art as tinting. The colour concentrates are available in up to about 1000 colours and shades. One of the disadvantages found with this system is that the liquid paint base must be provided in two shades, white and grey for each of the paint systems. Another disadvantage is that the full amount of colour concentrate must be added to each paint container otherwise the shade will vary from one container to another. Another disadvantage is that exacting care must be exercised by the manufacturer in filling both the liquid paint base container and the colour concentrate tube otherwise there will be a variance of colour from one container to another.

APPLICANT'S DEVELOPMENT

In accordance with the present invention, there is now provided a new paint system which will be broadly described as follows:

The new way of dispensing paint involves a method in which a special liquid base is provided, the base being transparent and devoid of hiding power because of the absence of active pigment therefrom. The paint is obtained by mixing the base with a liquid pigment concentrate which contains the coloured and active pigment. In accordance with the present invention the liquid transparent base comprises a liquid paint base free of active pigments comprises a dispersion of from 22 to 56% of reinforcing or extenders pigments in from 12 to 40% by weight of resin solids, the remainder of the composition being a solvent for the resin, the paint base having a P. V. C. of from 20 to 62%. The paint base is suitable for receiving a paint concentrate comprising a dispersion of from about 37% to about 72% by weight of active and reinforcing pigments, and from about 14% to about 21% by weight of resin solids, and a solvent for the resin, the concentrate having a P. V. C. of from 30% to 60%. Upon mixing the paint base and the concentrate there is obtained a paint possessing hiding power.

The paint base of the present invention is made up of a dispersion of inert extenders in a compatible film-forming vehicle, a solvent for the vehicle and preferably driers and anti-skinning agents. This paint base can be made to give, after mixture with the colour concentrate, an enamel, a satin, a flat, an exterior or a floor enamel finish. As dispensed on the market, the colour concentrate and paint base are sold in separate containers and cannot be used individually, the paint base filling about three quarters of its container, while the volume of the paint concentrate container corresponds to the volume of free space in the base container.

More specifically, the liquid transparent base of the present invention is made up by dispersing from 22 to 56% by weight of inert extenders in a film-forming vehicle in an amount such that the resin solids will be present in the base in the range of from 12 to 40% by weight, traces of driers and anti-skinning agents, the remainder of the composition being a solvent for the resin. The P. V. C. of the paint base prepared in accordance with the present invention may be selected within the range of from 20 to 62%, the selection being based on the paint system desired.

The liquid transparent base is suitable for mixing with a colour concentrate prepared by dispersing from 37 to 72% by weight of active and inert pigments in from 14 to 21% by weight of a resin, traces of driers and anti-skinning agents, the remainder being a solvent for the resin. The P. V. C. of the colour concentrate prepared in accordance with the present invention may be selected within from 30 to 60%, so that when the concentrate is combined with one of the various bases, the combination will have a P. V. C. characteristic of the type of paint desired.

The base characterized by its absence of hiding powers is suitable for mixing with the liquid pigment concentrate thus eliminating any possibility of varying the colour or shade from one container to another, as the total colour or hiding pigments are contained in the liquid pigment concentrate which is formulated and matched to a standard by the manufacturer during manufacture as is known to one skilled in the art. Upon mixing, an ordinary paint is obtained, the type of paint corresponding to the type of resin or oil and quantity of inert extender used in making up the paint base.

EXTENDERS

The reinforcing pigments or extenders which are used to make the base of the invention are those which have no hiding power in a vehicle of the type employed. Such materials are calcium carbonate, sodium aluminium silicate (nephelene syenite) of a low oil absorption, aluminium silicate (ASP 100) average particle size of .55 micron, barium sulfate (blanc fixe) medium oil absorption, magnesium carbonate, high oil absorption, magnesium silicate (blue talc) crypto-crystalline particles, calcium sulfate (anhydrous). When referring to low, medium and high oil absorption, the applicants have used the ASTM standards in which low oil absorption is from about 8 to about 12, medium is from about 18 to about 20 and high is 30 upwards.

To define those extenders having no hiding power, the descriptive name "reinforcing pigment" is more appropriate. This term "reinforcing pigment" is self-explanatory. Every paint of the type described in the present invention contains more or less reinforcing pigments or fillers. Different grades are found on the market for the paint industry. Each possesses definite physical properties which promote certain physical results when added to the paint.

For example, from the standpoint of economy "reinforcing pigments" are considered of primary importance, when used in combination with the hiding pigment. They also impart a greater weathering resistance on long term exposure. Those properties are also important in interior paint, for example, a flat paint or the flat base of the present invention. As generally known the type of "reinforcing pigment" to use in interior paint is one of high oil absorption, magnesium silicate for instance.

The property of high oil absorption will yield a paint of higher consistency. The particle size of such a filler is rather important in respect of the finish. The finer particle size pigments are usually easier to disperse than the coarser ones. There is thus an increase of sheen with a decrease in particle size. The selection of "reinforcing pigments" in formulating and manufacturing various paints is very important. They are by no means adulterants as they were considered in the past, but are becoming more and more definite components of the paint and are expressing their value in paints quite widely.

SOLVENTS

As far as the selection of the solvent, here a large selection is available. Suitable for the purpose of the present invention are terpene solvents, petroleum solvents and various naphthas. Here again the choice must be guided by the compatibility with the resin and other constituents of the mix.

FILM-FORMING VEHICLES

The film-forming vehicle which may be used to prepare the liquid transparent paint base of the present invention are any of the resins commonly used in the paint manufacturing art, for example, synthetic resins, natural resins and the oils known as drying oils, for example, linseed oil, soyabean oil, and others of the same class or mixture thereof. When choosing a vehicle for the preparation of the paint base, it should be noted that the vehicles selected must be compatible with the resin present in the liquid pigment concentrate with which the liquid transparent base will eventually be mixed. This selection does not present a problem to one skilled in the art, since the necessary information is usually contained in the specifications of the manufacturer of the vehicle. Preferably the vehicle used is one which is normally in liquid form.

More specifically, the following materials have been found to be most suitable: petroleum-derived unsaturated synthetic hydrocarbon drying oil, for example, the product known as "Panapol," supplied by Pan-American Petroleum Co.; modified glyceryl ester fast drying linseed oil (ADM-75-5) supplied by Archer Daniels Midland Co. (ADM); limed linseed oil, for example, "Ardenco L-40" also supplied by ADM; soya-dicyclopendiene copolymers (ADM 400) also an ADM product; pentaerythritol esters of refined tall oil (Ardex P. E.) phenol and resin-modified alkyds.

As is known, the P. V. C. is a percentage obtained by dividing the volume of the pigment by the sum of the volume of the solids of the resins and the volume of the pigment. Accordingly the selection of the amount of resin solids will be in function of the amount of pigment, which has a bearing on the P. V. C. percentage.

DRIERS

As mentioned previously driers may be added to the pigment concentrate. The driers which can be used are those of metallic compounds and which are soluble in drying oils and other paint vehicles. As an example of suitable driers there may be mentioned the metallic paint driers which fall within the following groups; metallic soaps or salts of fatty acids, metallic soaps or salts of resin acids, metallic soaps or salts of acids other than the above, metallic compounds other than soaps of oil or resin constituents.

ANTI-SKINNING AGENTS

The use of anti-skinning agents is well-known in the art and all such products are suitable for use in the present invention. As an example of anti-skinning agents, it has been found that methyl ethyl ketoxamine and guaiacol are particularly useful.

The amount of anti-skinning agents and driers which can be used can vary within the range of from about 0.4% to about 0.65% by weight. The amount of driers being within the range of from 0.38% to about 0.65% and the amount of anti-skinning agent being from about 0.01% to about 0.02% by weight.

APPLICATION

The paint bases of the present invention are suitable for receiving a colour concentrate to obtain a paint base, an enamel, a satin, a flat, an exterior or a floor enamel base finish. These bases are characterized by their absence of hiding power due to the fact that no active pigment is present in the base.

EXAMPLES

The embodiments of the present invention will be more fully understood by referring to the following examples wherein the preparation of suitable liquid pigment concentrates and various liquid transparent bases are illustrated.

Example 1

(Transparent enamel base of 28% P. V. C.)

|  | Gals. |
|---|---|
| Resin solids | 29.265 |
| Calcium carbonate | 11.365 |
| Varsol Mineral Spirits sold by the Esso Standard Oil Company | 16.00 |
| Soya lecithin | .303 |
| 24% lead napthanate | .362 |

The resin is an 85% solids soya bean oil modified pentaerythritol phthalate anhydride alkyd. All the above materials were charged to a pony mixer or other similar device and thoroughly mixed then passed once through a high speed stone mill (Moorehouse mill) the stones so set to obtain a grind of 8 when measured on a North standard gauge.

| | | |
|---|---|---|
| Varsol | gals | 17.00 |
| 6% cobalt naphthanate | gals | .085 |
| 14% calcium naphthanate | gals | .57 |
| Guaiacol anti-skinning agent | lbs | .314 |
| Total | gals | 75.00 |

The above were added and thoroughly mixed. This was found to be a suitable transparent enamel base for incorporating with colour concentrates of 30% P. V. C. (see Example 5).

Example 2

(Transparent satin base of 49% P. V. C.)

| | Gals. |
|---|---|
| Resin/100% | 19.40 |
| Calcium carbonate | 18.75 |
| Varsol | 24.50 |
| Aluminum tristearate | .70 |
| Lecithin | .70 |
| 24% lead naphthanate | .282 |

Resin same as Example 1. The same procedure was employed as in Example 1.

| | | |
|---|---|---|
| Varsol | gals | 10.00 |
| Cobalt 6% | gals | .03 |
| Calcium 4% | gals | .46 |
| Guaiacol anti-skinning agent | lbs | .026 |
| Total | gals | 75.00 |

The above were incorporated as in Example 1. This was found to be a suitable transparent satin base for combining with colour concentrates of 40% P. V. C. (see Example 6).

Example 3

(Transparent flat base of 62% P. V. C.)

| | Gals. |
|---|---|
| Resin/100% | 11.96 |
| Calcium carbonate | 20.18 |
| Dicalite diatomaceous silica, sold by Dicalite Company | 2.02 |
| Bentone 34 | .675 |
| Varsol | 23.755 |
| Lecithin | 1.00 |
| Lead 24% | .41 |

Resin was a 40% solids oil modified alkyd. The same procedure was employed as in Examples 1 and 2.

| | | |
|---|---|---|
| Varsol | gals | 15.00 |
| Guaiacol anti-skinning agent | lbs | .133 |
| Total | gals | 75.00 |

The above were incorporated as in Examples 1 and 2. This was found to be a suitable transparent flat base for combining with colour concentrates of 50% P. V. C. (see Example 7).

Example 4

(Transparent flat base of 59.9% P. V. C.)

| | Gals. |
|---|---|
| Resin/100% | 11.03 |
| Varsol | 30.465 |
| Calcium carbonate | 14.90 |
| Dicalite | 2.02 |
| Bentone 34 hydrous aluminum silicate, sold by Titanium Pigment Corporation | .675 |
| Lecithin | 1.00 |
| Lead 24% | .41 |

Resin was the same as Example 3. The same procedure was employed as in Examples 1 to 3.

| | | |
|---|---|---|
| Varsol | gals | 15.00 |
| Guaiacol anti-skinning agent | lbs | .133 |
| Total | gals | 75.00 |

The above were incorporated as in Examples 1 to 3. This was found to be a suitable transparent flat base for combining with colour concentrates of 60% P. V. C. (see Example 8).

Example 5

(Medium green colour concentrate of 30% P. V. C.)

| | Gals. |
|---|---|
| Resin/100% | 6.32 |
| Medium Chrome Green | 2.70 |
| Varsol | 10.98 |

The resin is an 85% solids oil modified pentaerythritol phthalate anhydride alkyd. All the above materials were charged to a steel ball mill and operated continuously for 56 hours. On sampling the mixture it was found to have reached a satisfactory grind of 8 when measured on a North Standard Gauge.

| | | |
|---|---|---|
| Varsol | gals | 5.00 |
| Cobalt 6% | gals | .20 |
| Guaiacol anti-skinning agent | lbs | .0665 |
| Total | gals | 25.00 |

The above materials were then added and thoroughly mixed. This was found to be a suitable colour concentrate for combining with one of the various transparent bases (see Example 1—Enamel transparent base).

Example 6

(Brown oxide colour concentrate of 40% P. V. C.)

| | Gals. |
|---|---|
| Resin/100% | 6.32 |
| Brown oxide No. 125, a synthetic brown iron oxide 97% $Fe_2O_3$ | 4.20 |
| Varsol | 7.40 |

Resin same as Example 5. Using the same procedure as Example 5, the material was milled until a grind of 8 was obtained.

| | | |
|---|---|---|
| Varsol | gals | 7.48 |
| Cobalt 6% | gals | .20 |
| Guaiacol anti-skinning agent | lbs | .0665 |
| Total | gals | 25.00 |

The above were incorporated as in Example 5. This was found to be a suitable colour concentrate for combining with one of the various transparent bases (see Example 2—Satin transparent base).

Example 7

(Light yellow colour concentrate of 50% P. V. C.)

| | Gals. |
|---|---|
| Resin/100% | 6.32 |
| $TiO_2$ RA-50 rutile titanium dioxide, Titanium Pigment Corp. | 3.52 |
| Lemon chrome | .45 |
| Calcium carbonate | 2.35 |
| Varsol | 10.00 |

Resin same as in Example 5. All the above materials were charged to a pebble mill and milled until a grind of 8 was obtained.

| | | |
|---|---|---|
| Varsol | gals | 2.36 |
| Cobalt 6% | gals | .20 |
| Guaiacol anti-skinning agent | lbs | .0665 |
| Total | gals | 25.00 |

The above were incorporated as in Examples 5 and 6. This was found to be a suitable colour concentrate for combining with one of the various transparent bases (see Example 3—Flat transparent base).

Example 8

(White colour concentrate of 60% P. V. C.)

| | Gals. |
|---|---|
| Resin/100% | 7.75 |
| Varsol | 5.65 |
| $TiO_2$ RA-50 | 5.00 |
| Zinc oxide | .50 |
| Calcium carbonate | 6.10 |

Resin same as Examples 5 to 7. All the above materials were charged to a pony mixer or similar device and thoroughly mixed then passed once over a three roll pigment dispersion mill, the rolls so set as to give a grind of 8 when measured on a North Standard Gauge.

| | | |
|---|---|---|
| Cobalt 6% | gals | .20 |
| Guaiacol anti-skinning agent | lbs | .0725 |

The above were incorporated as in Examples 5 to 7.

This was found to be a suitable colour concentrate for combining with one of the various transparent bases (see Example 4—Flat transparent base).

FORMULATION

In accordance with the present invention the formulation is carried out by first selecting a constant P. V. C. for the various colours in which the colour concentrate is to be prepared. Having thus selected the P. V. C. for the colour concentrates and knowing the variation permissible in the P. V. C. of each paint system, the preparation of each paint base requires the necessary adjustment to obtain the desired and permissible P. V. C. for each paint system. This will be illustrated in the examples to follow.

In accordance with the present invention, the colour system is arranged in such a manner as to take advantage of the standard available containers of one gallon, one quart, one sixteenth, and one sixty-fourth. More specifically, the system is formulated one quarter of the volume as liquid pigment concentrate and three quarters as transparent paint base.

During our investigation, various pigment volume concentration (P. V. C.) ranging from 30% to 60% were found to work satisfactorily, however the liquid pigment concentrate finally selected for this system, which appeared to give the best all round results, in regard to can stability, settling, and skinning, was a pigment volume concentrate of 54.2% and a resin solids vehicle of 43.5% by weight with a total solids of 55.3% by volume.

The liquid pigment concentrate is formulated for a 25 gallon yield using the above percentages, and uses the desired amount of active pigment for 100 gallons of finished paint, as this concentrate is to be combined with the paint base in the proportion of one quarter by volume to three quarters of the paint base.

The following examples will illustrate the actual formulation in accordance with the present invention.

Example 9
(Green colour concentrate of 54.2% P. V. C.)

|  | Pounds | Gallons | |
|---|---|---|---|
| 55.3% of 25 gallons | | 13.82 | 13.82 |
| The desired amount of active pigment (Chrome Green Medium) | 132 | 3.30 | |
| Resin Solids [1] | 66.5 | 10.52<br>6.32 | |
| Calcium Carbonate | 108.0 | [3] 4.20<br>4.20 | |
| Varsol [2] | 86.5 | 0.00 | 11.18 |
| Total | | | 25.00 |

[1] 54.2% of 13.82 gals.—7.5 gals. Pigment active and inert; 45.8% of 13.82 gals.—6.32 gals. Resin solids.
[2] 66.5 lbs. resin solids } 43.5% solids vehicle.
86.5 lbs. Varsol
153.0 lbs.
[3] This volume required to arrive at 54.2% P. V. C.

To maintain a constant P. V. C. the resin solids must remain constant, the volume of the pigment must remain constant but the ratio of active and inert may vary according to the quantity of active pigment required.

Using 70% solids oil modified pentaerythritol phthalate anhydride alkyd, the formula was made up as follows.

|  | Pounds | Gallons |
|---|---|---|
| P-470/70% soyabean oil phthalic anhydride pentaerythritol alkyd resin, sold by Reichhold Chemicals Incorporated | 95 | 10 |
| Chrome Green Medium | 132 | 3.3 |
| Calcium carbonate | 108 | 4.2 |
| Varsol | 58 | 7.5 |
| Total | | 25.00 |

All the above material with the exception of 11.5 lbs. Varsol were charged to a pony mixer or similar device and thoroughly mixed and then passed once through a high speed stone mill (Moorehouse Mill) the stone so set to obtain a grind of 8 when measured on a North Standard Gauge.

|  | Lbs. |
|---|---|
| Varsol | 11.5 |
| Cobalt 6% | 2.0 |
| Guaiacol | .0665 |

The above were then incorporated and thoroughly mixed. This was found to be a suitable colour concentrate when combined with one of the various paint bases (see Examples 11 to 15).

Example 10
(White colour concentrate of 54.2% P. V. C.)

|  | Pounds | Gallons |
|---|---|---|
| P-470/70% | 95 | 10 |
| TiO₂ R.A. 50 | 210 | 5 |
| Zinc Oxide | 27 | .5 |
| Calcium Carbonate | 54 | 2.0 |
| Varsol | 58 | 7.5 |
| Total | | 25.00 |

|  | Pounds | Gallons |
|---|---|---|
| Cobalt 6% | 2 | .2 |
| Guaiacol | .0665 | |

The above were incorporated as in Example 9. This was found to be a suitable colour concentrate when combined with one of the various paint bases (see Examples 11 to 15—Driers and anti-skinning agent).

These are not included in the volume of the concentrate. Only cobalt driers were used in the concentrate. The amount of anti-skinning agent is based on the solids of the resin as recommended by the manufacturer.

Example 11

Having established that a colour concentrate with a constant P. V. C. within the range of 30% to 60% can be used, but in this case using a colour concentrate with a constant P. V. C. of 54.2% the base portion was formulated as follows, using a 100 gallons formula of the product desired.

| Material | Enamel, gallons | Colour Concentrate, gallons | Enamel Base, gallons |
|---|---|---|---|
| Resin 100% | 35.583 | 6.32 | 29.263 |
| Solvent | 49.03 | 11.18 | 37.85 |
| Active Pigment | 3.30 | [1] {3.30 | |
| Inert | 10.765 | {4.20 | 6.565 |
| Cobalt 6% | .285 | [2] .2 | .085 |
| A. S. A. Guaiacol anti-skinning agent | Trace | Trace | Trace |
| Calcium 4% | .57 | | .57 |
| Lead 24% | .362 | | .362 |
| Lecithin | .303 | | .303 |
| Total | 100.00 | 25.00 | 75.00 |

[1] Volume constant. Vary inert according to active pigment required.
[2] Not included in volume.

FINAL FORMULA FOR ENAMEL BASE—EXAMPLE 11

|  | Pounds | Gallons |
|---|---|---|
| Ester 56% | 54 | 6.0 |
| 604/85%—Oil modified pentaerythritol phthalate anhydride alkyd. | 334 | 33.365 |
| Atomite color | 246 | 6.565 |
| Varsol | 215 | 27.75 |
| Lecithin | 3.03 | .303 |
| Cobalt 6% | .85 | .085 |
| Calcium 4% | 5.70 | .57 |
| Lead 24% | 3.62 | .362 |
| Guaiacol | .314 gals. | |
| Total | | 75.00 |

P. V. C. of base 18.1%. Combined with colour concentrate 28%.

Example 12

| Material | Satin, gallons | Colour Concentrate, gallons | Satin Base, gallons |
|---|---|---|---|
| Resin | 25.72 | 6.32 | 19.4 |
| Solvent | 49.18 | 11.18 | 38.0 |
| Pigment: | | | |
| Active | [2] 22.928 | [1] 7.50 | |
| Inert | | | 15.428 |
| Alum. Stearate | .70 | | .70 |
| Lecithin | .70 | | .70 |
| Lead 24% | .282 | | .282 |
| Cobalt 6% | .230 | [3] .20 | .030 |
| Calcium 4% | .460 | | 0.460 |
| A. S. A | Trace | Trace | Trace |
| Total | 100.00 | 25.00 | 75.00 |

[1] Volume constant. Vary inert according to active pigment required.
[2] Active and extender combined.
[3] Not included in volume.

FINAL FORMULA FOR SATIN BASE—EXAMPLE 12

| | Lbs. | Gals. |
|---|---|---|
| 604/85% (Same as Example 11) | 242 | 24.2 |
| Varsol | 257 | 33.2 |
| Atomite | 292 | 10.77 |
| Dicalite | 103 | 4.658 |
| Alum. Stearate | 7 | .70 |
| Lecithin | 7 | .70 |
| Lead 24% | 2.82 | .282 |
| Cobalt 6% | .30 | .030 |
| Calcium 4% | 4.60 | .460 |
| Guaiacol | .206 | |
| Total | | 75.00 |

P. V. C. of base 45%. Combined with colour concentrate 47.5%.

Example 13

| Material | Flat, gals. | Colour Concentrate, gals. | Flat Base, gals. |
|---|---|---|---|
| Resin | 18.28 | 6.32 | 11.96 |
| Solvent | 51.115 | 11.18 | 39.935 |
| Active pigment | | [1] 7.50 | |
| Inert | [2] 26.50 | | 19.00 |
| Dicalite | [2] 2.02 | | 2.02 |
| Bentone No. 34 | [2] .675 | | .675 |
| Lecithin | [2] 1.00 | | 1.00 |
| Lead 24% | [2] .41 | | .41 |
| Cobalt 6% | [2] .20 | [3] .20 | |
| A. S. A | [4] | [4] | [4] |
| Total | 100.00 | 25.00 | 75.00 |

[1] Volume constant. Vary inert according to active pigment required.
[2] Active and extender combined.
[3] Not included in volume.
[4] Trace.

FINAL FORMULA FOR FLAT BASE—EXAMPLE 13

| | Lbs. | Gals. |
|---|---|---|
| Calwhite | 512 | 19.00 |
| Dicalite | 47 | 2.02 |
| Bentone No. 34 | 10 | .675 |
| 1952—40 Oil Modified Alkyd | 332 | 37.66 |
| Varsol | 110 | 14.235 |
| Lecithin | 10 | 1.00 |
| Lead 24% | 4.1 | .41 |
| Guaiacol | .133 | .41 |
| Total | | 75.00 |

P. V. C. of base 64.5%. Combined with colour concentrate 61.5%.

Example 14

| Material | Exterior, gals. | Colour Concentrate, gals. | Exterior Base, gals. |
|---|---|---|---|
| Linseed Oils | 41.02 | 6.32 | 34.70 |
| Solvent | 38.38 | 11.18 | 27.20 |
| Active Pigment | | [1] 7.50 | |
| Inerts | [2] 20.055 | | 12.555 |
| Litharge | [3] | | [3] |
| Lead 24% | .465 | | .465 |
| A. S. A | [3] | [3] | [3] |
| Cobalt 6% | .20 | [4] .20 | |
| Total | 100.00 | 25.00 | 75.00 |

[1] Volume constant. Vary inert according to active pigment required.
[2] Active and extender combined.
[3] Trace.
[4] Not included in volume.

FINAL FORMULA FOR EXTERIOR BASE—EXAMPLE 14

| | Lbs. | Gals. |
|---|---|---|
| Linseed Oils | 320 | 34.70 |
| Varsol | 211 | 27.20 |
| Atomite | 200 | 7.265 |
| Asbestine magnesium silicate, sold by Canadian Johns-Manville Co | 131 | 4.61 |
| Dicalite | 15 | .68 |
| Litharge | 3.03 | |
| Lead 24% | 4.65 | .465 |
| Guaiacol | .320 | |
| Total | | 75.00 |

P. V. C. of base 26.6%. Combined with colour concentrate 33.0%.

Example 15

| Material | Floor Enamel, gals. | Colour Concentrate, gals. | Floor Enamel Base, gals. |
|---|---|---|---|
| 13.95M/70% Phenolic oil modified alkyd resin (70% solids) U. S. Industrial Chemical Co | | 6.32 | 18.15 |
| 5280/80% | 36.97 | | 12.50 |
| Solvent | 44.48 | 11.18 | 33.30 |
| Active pigment | | [1] 7.50 | |
| Inert | [2] 17.00 | | 9.50 |
| Lecithin | .425 | | .425 |
| Lead 24% | .39 | | .39 |
| Cobalt 6% | .31 | [3] .20 | .11 |
| Calcium 4% | .62 | | .62 |
| A. S. A | Trace | Trace | Trace |
| Total | 100.00 | 25.00 | 75.00 |

[1] Volume constant. Vary inert according to active pigment required.
[2] Active and extender combined.
[3] Not included in volume.

FINAL FORMULA FOR FLOOR ENAMEL—EXAMPLE 15

| | Lbs. | Gals. |
|---|---|---|
| 13.95M/70% | 259 | 28.15 |
| 52.80/80% tall oil modified maleic anhydride alkyd, sold by Albermole Paper Mfg. Co | 152 | 16.40 |
| Varsol | 149 | 19.40 |
| Atomite | 255 | 9.50 |
| Lead 24% | 3.9 | .39 |
| Cobalt 6% | 1.1 | .11 |
| Calcium 4% | 6.2 | .62 |
| Lecithin | 4.25 | .425 |
| Guaiacol | .302 | |
| Total | | 75.00 |

P. V. C. of base 23.7%. Combined with colour concentrate 31.5%.

This application is a continuation-in-part of application Serial No. 357,914, filed May 27, 1953 (now abandoned).

We claim:

A liquid transparent paint base having no hiding power and suitable for mixing with a liquid pigment concentrate to provide a paint giving hiding power, consisting essentially of a hiding-pigment-free dispersion of from 22% to 56% by weight of extender pigment in a film forming vehicle and a solvent for said film-forming vehicle, and said film-forming vehicle being selected from the group consisting of drying oils, resins, and mixtures of drying oils and resins present in an amount such that the base has a solid content within the range of from 12% to 40% by weight, the base having a P. V. C. within the range from 20% to 62%.

References Cited in the file of this patent

UNITED STATES PATENTS

| | | |
|---|---|---|
| 952,863 | Arnold | Mar. 22, 1910 |
| 2,180,721 | Roon et al. | Nov. 21, 1939 |
| 2,348,619 | Green | May 9, 1944 |
| 2,528,530 | Machleder | Nov. 7, 1950 |

FOREIGN PATENTS

| | | |
|---|---|---|
| 472,632 | Canada | Apr. 3, 1951 |

OTHER REFERENCES

Pages 295 and 296 of the publication Paint and Varnish Technology, by Von Fischer (1948), published by Reinhold Publishing Corp., N. Y.

Page 122 of publication "Painting and Decorating," by A. E. Hurst (1949), published by Charles Griffin & Co., 42 Drury Lane, London, England.